United States Patent
Takanashi

(10) Patent No.: US 6,778,335 B2
(45) Date of Patent: Aug. 17, 2004

(54) LENS BARREL WHOSE LENGTH CAN BE REDUCED

(75) Inventor: Tatsuo Takanashi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 182 days.

(21) Appl. No.: 10/197,154

(22) Filed: Jul. 17, 2002

(65) Prior Publication Data

US 2003/0035228 A1 Feb. 20, 2003

(30) Foreign Application Priority Data

Aug. 20, 2001 (JP) ........................................ 2001-249390
May 10, 2002 (JP) ........................................ 2002-136332

(51) Int. Cl.⁷ ............................ G02B 15/14; G02B 7/02
(52) U.S. Cl. ........................ 359/704; 359/826; 359/823
(58) Field of Search ................................. 359/828, 694, 359/703, 704, 823, 826, 827

(56) References Cited

U.S. PATENT DOCUMENTS 5,715,481 A * 2/1998 Ohmiya ........................ 396/79
2002/0191098 A1 * 12/2002 Oshima ........................ 348/345

FOREIGN PATENT DOCUMENTS

JP    4-52628 A    2/1992

* cited by examiner

*Primary Examiner*—Ricky Mack
(74) *Attorney, Agent, or Firm*—Frishauf, Holtz, Goodman & Chick, P.C.

(57) ABSTRACT

A lens barrel is provided which includes a stationary frame and a second holding frame. One end of a second main rod is attached to the second holding frame with a sleeve between. One end of the second sub rod is fixed to the second holding frame, and the other ends of the second main rod and second sub rod are attached to the stationary frame so that the second main rod and second sub rod can freely slide. Consequently, the second holding frame is borne while being permitted to freely advance or withdraw relative to the stationary frame without rotating by the main rod and second sub rod. The main rod is fixed to neither the stationary frame nor lens holding frame but can slide by itself. Therefore, even when the lens barrel is collapsed, the main rod will not jut backward beyond the stationary frame.

19 Claims, 10 Drawing Sheets

//LENS BARREL WHOSE LENGTH CAN BE REDUCED

This application claims the benefit of Japanese Applications No. 2001-249390 filed in Japan on Aug. 20, 2001 and No. 2002-136332 filed in Japan on May 10, 2002, the entire contents of which are incorporated herein by reference.

BACKGROUND OF THE INVENTION

1. Field of the Invention

The present invention relates to the structure of a lens barrel having a movable frame member.

2. Description of the Related Art

A lens barrel having a movable frame member that has been disclosed in Japanese Unexamined Patent Application Publication No. 4-52628 has a stationary frame and a movable lens holding frame. The movable frame is advanced or withdrawn for the purpose of zooming or focusing. Two rods of a main rod and a detent sub rod are fixed to a second group-of-lenses holding frame that is one kind of movable frame. The rods are borne by the stationary frame while being permitted to freely slide. A third group-of-lenses holding frame is borne by the rods and interposed between the stationary frame and second group-of-lenses holding frame. The second group-of-lenses holding frame and third group-of-lenses holding frame are borne by the stationary frame while being permitted to freely advance or withdraw with their rotations restricted.

However, the lens barrel disclosed in the Japanese Unexamined Patent Application Publication No. 4-52628 has a drawback described below. Namely, when the second group-of-lenses holding frame is plunged into a position for collapse, if the distance to the stationary frame gets shorter than the distance thereto attained when the second group-of-lenses holding frame is located at a wide-angle photo position, the main rod juts out of the lens barrel behind the stationary frame. It is therefore necessary to preserve a space, to which the jutting main rod escapes, within a camera body with the camera body and the lens barrel joined. This restricts arrangement of components within the camera body. However, if the main rod is designed not to project toward the camera body, the overall length of the lens barrel must be increased by a length corresponding to the projection.

SUMMARY OF THE INVENTION

Accordingly, the present invention attempts to solve the foregoing problems. According to the present invention there can be provided a lens barrel whose length can be decreased with no significant restrictions imposed on arrangement of components within a camera, and whose structure is simple.

One lens barrel in accordance with the present invention includes a movable frame member and a rod member that is incorporated in the lens barrel in order to guide and permit the frame member to move along an optical axis and that is borne to be movable along the optical axis by itself. The frame member advances or withdraws while being guided by the rod member.

Another lens barrel in accordance with the present invention includes a first frame member that is movable, a rod member that is incorporated in the lens barrel in order to guide the first frame member and permit it to move along an optical axis, and a second frame member that moves relatively to the first frame member. The rod member is engaged with the first frame member and second frame member, and can freely slide along the optical axis by itself.

Other features of the present invention and advantages thereof will be apparent from the description below.

DETAILED DESCRIPTION OF THE PREFERRED EMBODIMENTS

An embodiment of the present invention will be described in conjunction with the drawings below.

Figure 1:
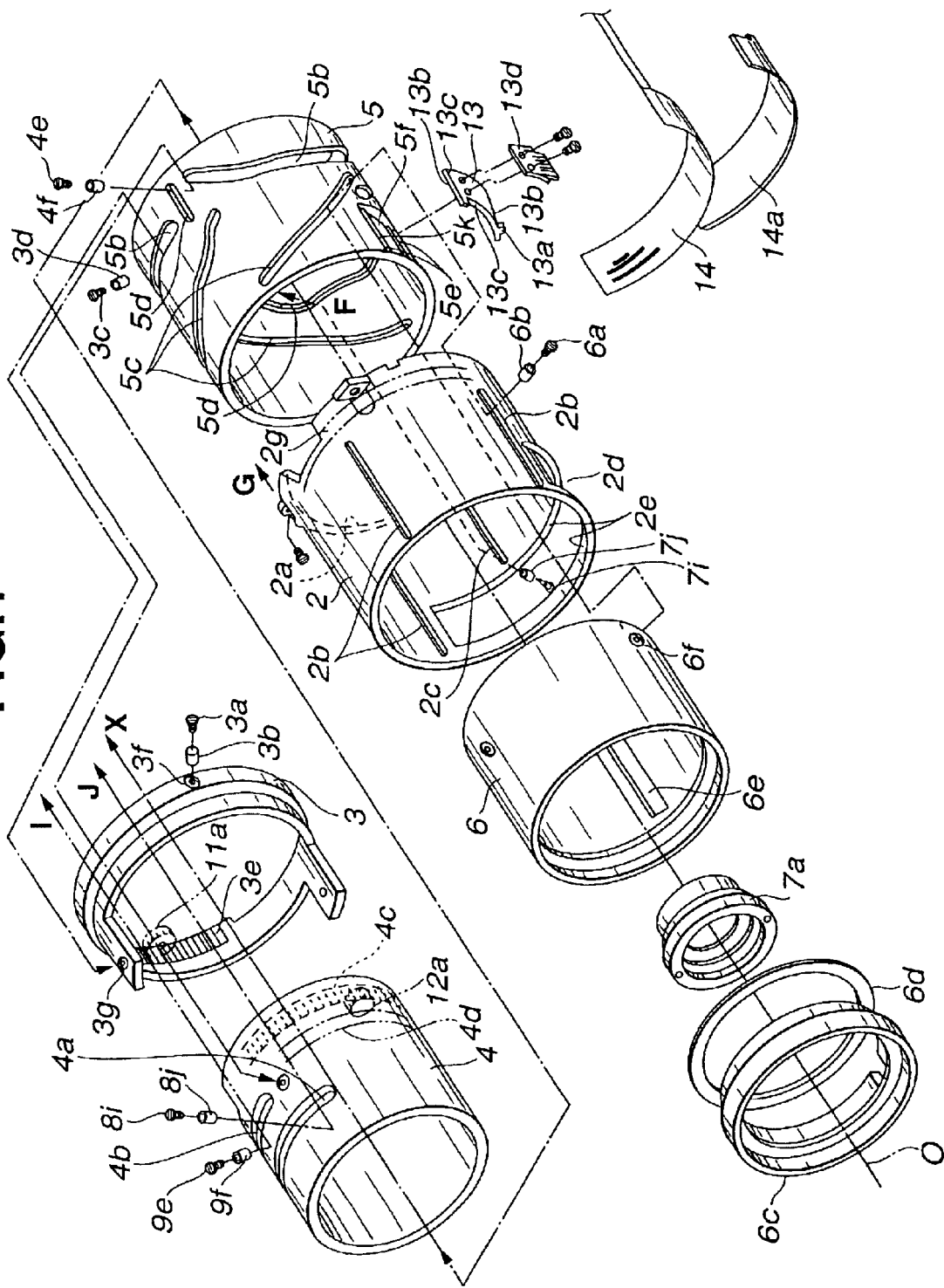
FIG. 1 is part of an exploded perspective view of a zoom lens barrel in accordance with an embodiment of the present invention.
Figure 2:
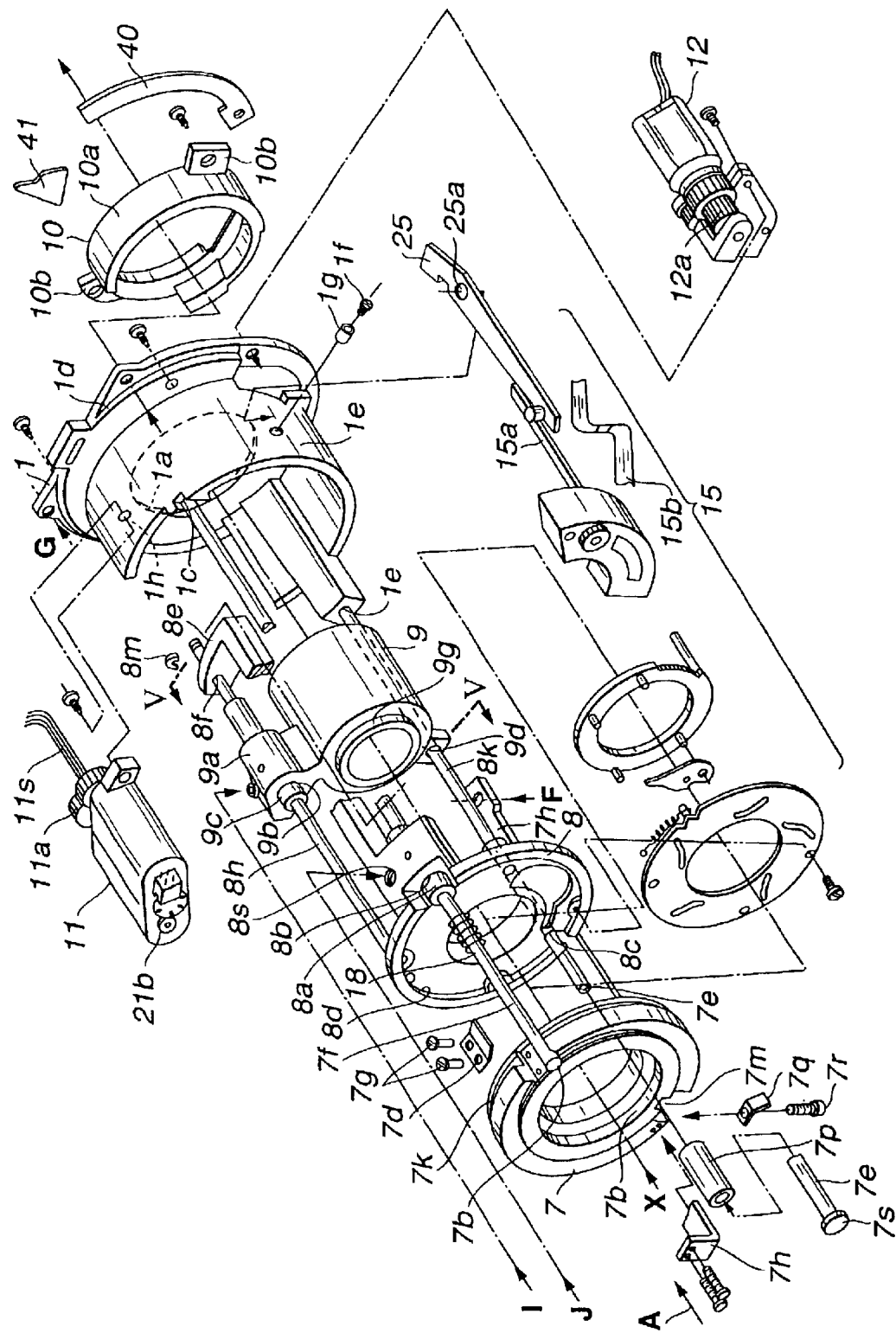
FIG. 2 is the other part of the exploded perspective view of the zoom lens barrel in accordance with the embodiment shown in FIG. 1.
Figure 3:
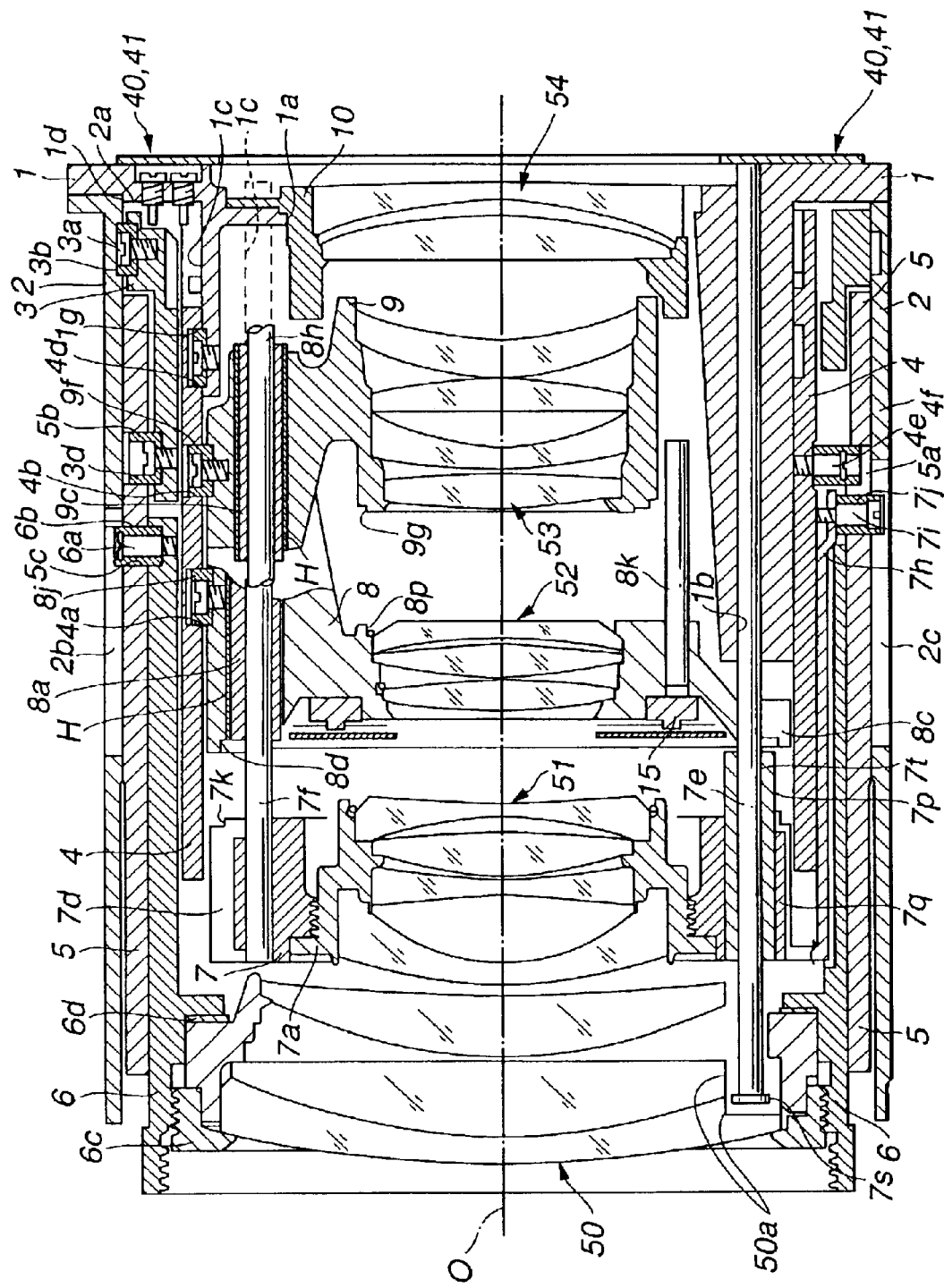
FIG. 3 is a longitudinal sectional view showing the zoom lens barrel in accordance with the embodiment shown in FIG. 1 with a lens frame collapsed.

FIGS. 1 and 2 are exploded perspective views of a zoom lens barrel in accordance with an embodiment of the present invention. FIG. 3 is a longitudinal sectional view showing the zoom lens barrel being collapsed.

The zoom lens barrel enables zooming and focusing, and collapse. The zoom lens barrel consists mainly of a stationary frame 1 that is a second frame member, a stationary lens frame 2 fixed to the stationary frame 1, a focus ring 3, an inner zoom drum 4, an outer zoom drum 5, and a first group-of-lenses frame 6 that is a group-of-focusing lenses frame. The zoom lens barrel further includes a second group-of-lenses holding frame 7 that is a group-of-focusing lenses frame and a first frame member (movable frame), a third group-of-lenses holding frame 8 that is a group-of-lenses frame holding lenses other than focusing lenses and a third frame member, a fourth group-of-lenses holding frame 9 that is a group-of-lenses frame holding lenses other than the focusing lenses, and a fifth group-of-lenses holding frame 10. The zoom lens barrel also includes first, second, third, fourth, and fifth groups of lenses 50, 51, 52, 53, and 54 (FIG. 3) that are held directly or indirectly in the frames, a focus drive unit 11, a zoom drive unit 12, an aperture stop unit 15, and a zoom encoder.

The groups of lenses 50 to 54 are not shown in FIG. 1 and FIG. 2 but are shown in the sectional view of FIG. 3 while being collapsed.

Figure 6:
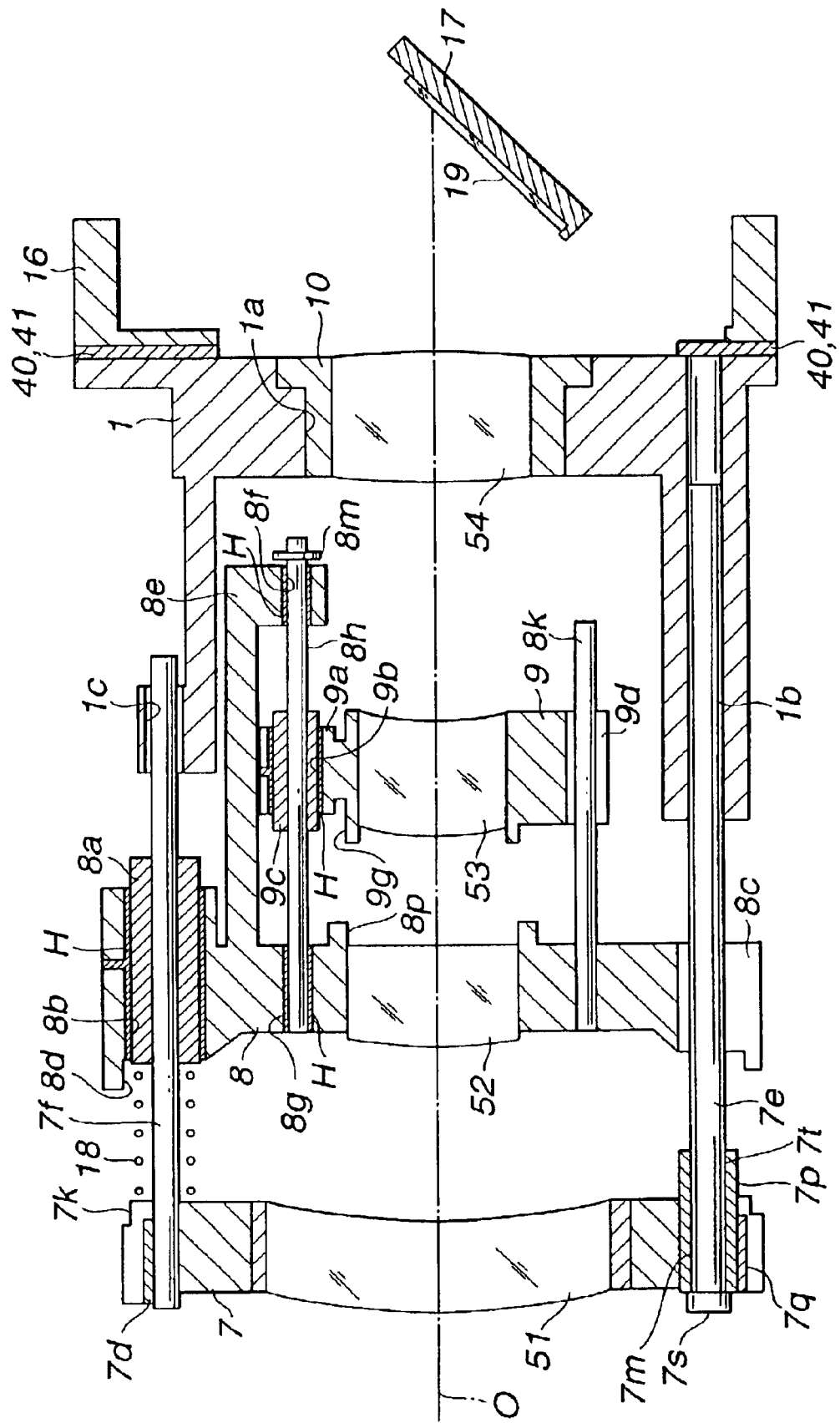
FIG. 6 is a longitudinal sectional view showing the zoom lens barrel in accordance with the embodiment shown in FIG. 1 with rods mounted in lens holding frames.

The stationary frame 1 is fixed to a mirror chamber 16 incorporated in a camera body with spacers 40 and 41 between them. The spacers 40 and 41 are used to adjust the distance between a mirror frame 17, which holds a movable reflecting mirror 19 and is mounted in the mirror chamber 16 as shown in the longitudinal sectional view of FIG. 6 showing lens holding frames, and the stationary frame 1. Moreover, the stationary frame 1 has a hole 1a, in which the fifth group-of-lenses frame 10 is locked, formed in the center thereof, and has an engaging portion 1d, with which the stationary lens frame 2 engages, integrated with an attachment flange thereof. Furthermore, the stationary frame 1 has a cylindrical part 1e that bears the inner zoom drum 4 while permitting it to freely rotate about an optical axis O. A sliding pin 1g that restricts the optical-axis directional movements of the inner zoom drum 4 is fixed to the cylindrical part 1e using a screw 1f.

Moreover, the stationary frame 1 has an engagement hole 1b and an engagement oblong hole 1c formed for supporting a second group-of-lenses main rod 7e and a second group-of-lenses sub rod 7f while permitting them to freely slide along the optical axis. Furthermore, the focus drive unit 11 is attached to an attachment surface 1h that is exposed by cutting away part of the cylindrical part 1e. The zooming drive unit 12 is also attached to the stationary frame 1. A charge lever 25 that is manipulated in order to operate the aperture stop unit 15 is pivoted to the stationary frame 1 through a shaft hole 25a.

The stationary lens frame 2 has a cylindrical shape and is secured with an edge of an internal surface 2a thereof engaged with the engaging portion 1d of the stationary frame 1. Guiding rectilinear grooves 2b and 2c for rectilinearly guiding the first group-of-lenses frame 6 and second group-of-lenses holding frame 7 respectively are formed along the optical axis O. A bottomed internal-surface groove 2g for restricting the axial directional position of the focus ring 3 is formed in a circumferential direction in the internal surface of the stationary frame 1. Likewise, an oblong hole 2d for restricting the axial directional position of a contact base 13 is formed in the circumferential direction on the edge of the internal surface of a cylindrical part of the stationary lens frame 2 opposite to the edge thereof which is engaged with the stationary frame.

Figure 15A:
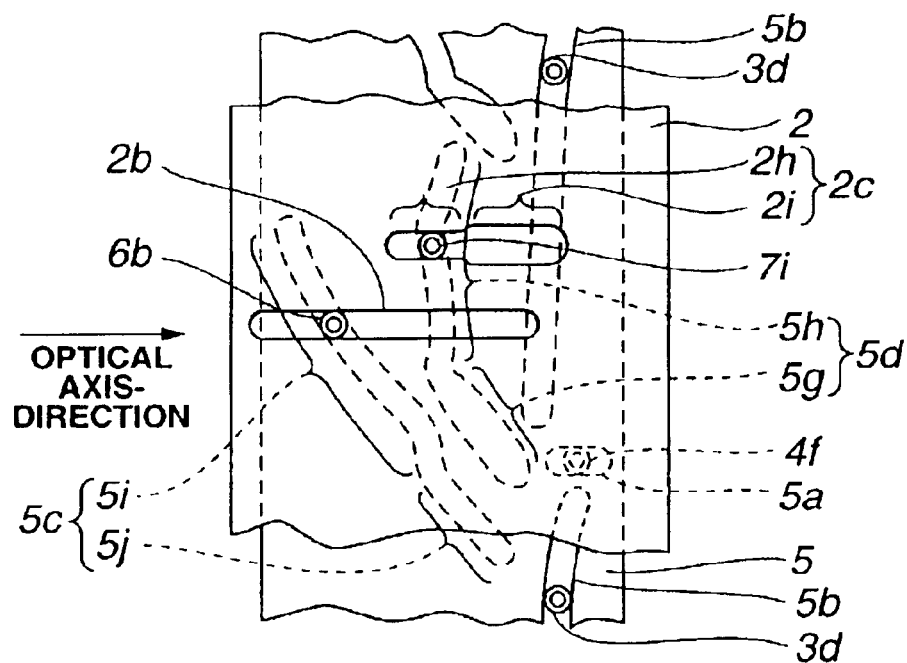
FIG. 15A shows the developments of inner and outer zoom drums incorporated in the zoom lens barrel in accordance with the embodiment shown in FIG. 1 and moved for zooming.

The rectilinear groove 2c is, as seen from the development diagram of FIG. 15A, composed of a zooming groove portion 2h whose width is equal to the outer diameter of a roller 7j that is fitted in the groove portion, and a collapse groove portion 2i whose width is larger than the outer diameter thereof. This groove portion 2i is a portion which is used when the lens frame collapses.

The focus ring 3 has an annular shape. The periphery of the focus ring 3 is engaged with the internal surface 2a of the stationary lens frame 2. An internal gear 3d that meshes with an output gear 11a included in the focus drive unit 11 is formed in the internal surface of the focus ring 3. Moreover, a sliding pin 3b is fixed to a pin fixing mount on the periphery of the focus ring 3 using a screw 3a. The sliding pin 3b is fitted in the internal-surface groove 2g formed in the stationary lens frame 2 while being permitted to freely slide, whereby the movements along the optical axis O of the focus ring 3 are disabled.

A sliding pin 3d causing the outer zoom drum 5 to move along the optical axis is fixed to a pin fixing mount 3g, which is a projection and loosely engaged with the internal surface of the outer zoom drum 5, using a screw 3c. Incidentally, the sliding pin 3d is fitted in a focus cam groove 5b formed in the zoom drum 5 while being permitted to freely slide.

The inner zoom drum 4 is a cylindrical member. The internal surface of the inner zoom drum 4 is engaged with the cylindrical part 1e of the stationary frame 1 while being permitted to freely rotate. The sliding pin 1g fixed to the stationary frame 1 is fitted in an internal-surface groove 4d formed in the internal surface of the inner zoom drum 4, whereby the optical-axis directional movements of the inner zoom drum 4 are disabled. An internal gear 4c that is meshed with an output gear 12a of the zoom drive unit 12 which is driven based on a zooming control signal is formed in the internal surface of the inner zoom drum 4.

The zoom drum 4 has cam grooves 4a and 4b that serve as a first cam means for driving the third and fourth group-of-lenses holding frames 8 and 9 for the purpose of zooming. Sliding pins 8j and 9f fixed to the third and fourth group-of-lenses holding frames 8 and 9 respectively are fitted in the cam grooves 4a and 4b. Talking of the shapes of the cams, as shown in the development diagram of FIG. 14, the cam grooves 4a and 4b each include a collapse cam groove portion 4g or 4h and a zooming cam groove portion 4i or 4j. The collapse cam groove portions 4g and 4h do not displace the sliding pins along the optical axis, but cause the lens frames to collapse. The cam groove portions 4i and 4j displace the sliding pins along the optical axis, and cause the lens frames to move for zooming. On the periphery of the zoom drum 4, a roller 4f serving as a coupling member is supported by a pin 4e while being permitted to freely rotate. The roller 4f is fitted in a rectilinear groove 5a formed in the outer zoom drum 5.

The outer zoom drum 5 is a cylindrical member. The periphery of the outer zoom drum 5 and the internal surface thereof are engaged with the stationary lens frame 2 and first group-of-lenses frame 6 respectively while being permitted to freely rotate or slide. The rectilinear groove 5a is formed along the optical axis O. The outer zoom drum 5 is driven to rotate proportionally to a magnitude of zooming by means of the inner zoom drum 4 by way of the roller 4f that is fitted in the rectilinear groove 5a.

Furthermore, the zoom drum 5 has a focus cam groove 5b whose size is proportional to a magnitude of thrust for focusing. Since the sliding pin 3d fixed to the focus ring 3 is fitted in the focus cam groove 5b, the zoom drum 5 is moved rectilinearly along the optical axis by a length proportional to a magnitude of focusing.

Furthermore, the zoom drum 5 has cam grooves 5c and 5d that serve as a second cam means. A first group-of-lenses roller 6b and a second group-of-lenses roller 7j borne by the first group-of-lenses frame 6 and second group-of-lenses frame 7 respectively are fitted in the cam grooves 5c and 5d respectively. Consequently, the first group-of-lenses frame 6 and second group-of-lenses holding frame 7 are displaced along the optical axis O responsively to the rotation of the zoom drum 5 for zooming or the axial directional movement thereof for focusing.

Figure 15B:
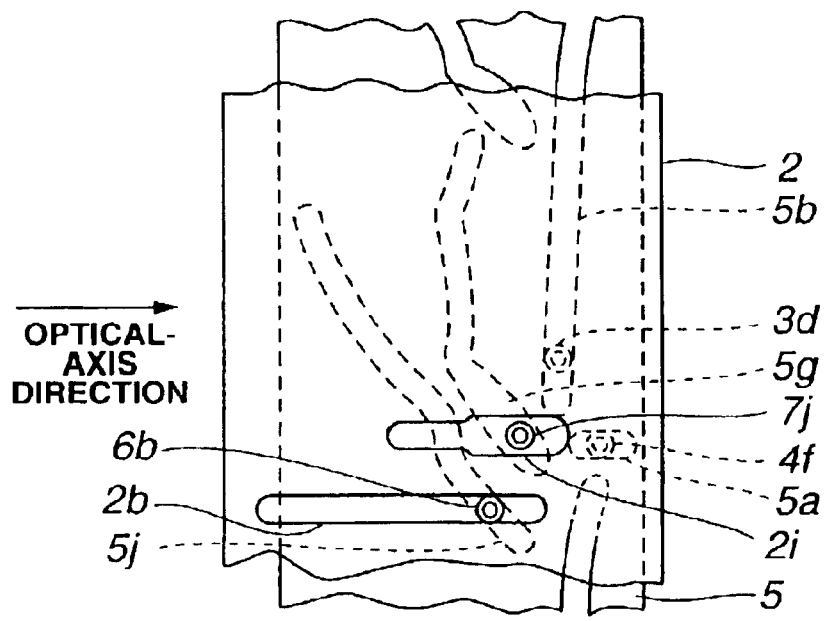
FIG. 15B shows the developments of the inner and outer zoom drums incorporated in the zoom lens barrel in accordance with the embodiment shown in FIG. 1 and moved for collapsing lens frames.

The cam grooves 5c and 5d each include a zooming cam groove portion 5i or 5h and a collapse cam groove portion 5j or 5g. The zooming cam groove portions 5i and 5h determine positions to the first and second group-of-lenses holding frames 6 and 7 are driven for the purpose of focusing and zooming. The collapse cam groove portions 5j and 5g causes the first group-of-lenses frame 6 or second group-of-lenses holding frame 7 to move to the position for collapse, that is, plunge into the camera body when the camera is unused. Moreover, the width of the cam groove portion 5g is larger than the outer diameter of the roller 7j that is fitted in the cam groove portion for fear the groups of lenses may interfere with each other during plunging (FIGS. 15A and 15B).

The zoom drum 5 has a stepped rectangular hole 5f, which guides the contact base 13 for the zoom encoder that will be described later, formed at a position at which the stepped rectangular hole 5f meets the oblong hole 2d formed in the stationary lens frame 2.

The first group-of-lenses frame 6 to which the first group-of-lenses holding frame 6c is screwed has a cylindrical shape. The periphery of the first group-of-lenses frame 6 is engaged with the outer zoom drum 5 while being permitted to slide freely. The first group-of-lenses roller 6b is attached to a counterpart 6f, which is formed on the periphery of the first group-of-lenses frame 6 and fitted in the cam groove 5c, while being permitted to freely rotate. The first group-of-lenses roller 6b is passed through the cam groove 5c and the rectilinear groove 2b formed in the stationary lens frame 2. The first group-of-lenses frame 6 is therefore guided rectilinearly along the optical axis O owing to the rectilinear groove 2b while being moved along with the rotation or rectilinear movement of the zoom drum 5.

A concave part 6e that is a thinner part is extended in an axial direction in the internal surface of the first group-of-lenses frame 6. The concave part 6e serves as a place to which a second group-of-lenses drive strip 7h, which will be described later, is escaped.

The first group of lenses 50 is held in the first group-of-lenses holding frame 6c. A spacer 6d is used to adjust an inter-lens space. The first group of lenses 50 held in the first group-of-lenses holding frame 6c is borne by the first group-of-lenses frame 6.

The second group-of-lenses holding frame 7 is a member for holding the second group-of-lenses frame 7a in which the second group of lenses 51 is mounted.

Figure 4:
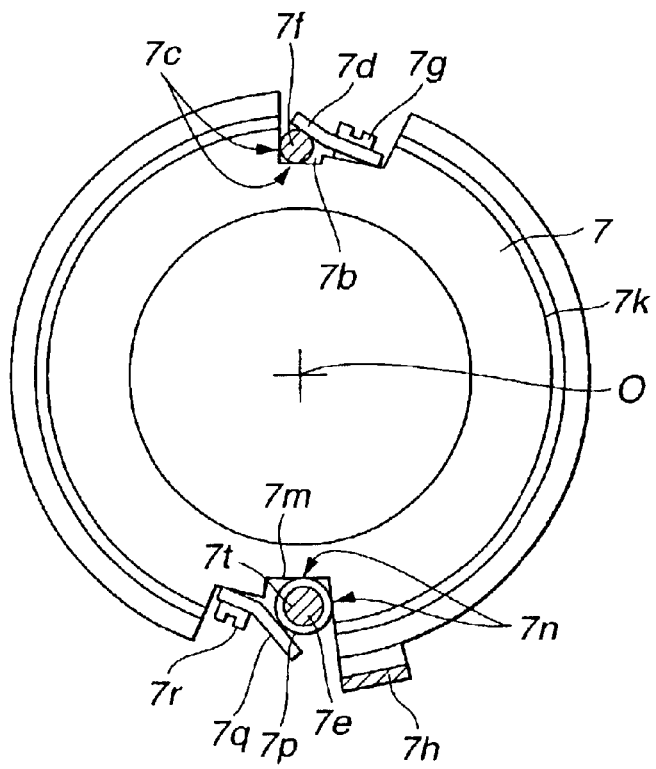
FIG. 4 shows the zoom lens barrel shown in FIG. 1 and seen in the direction of an arrow A.

The second group-of-lenses holding frame 7 has, as shown in FIG. 4, two concave notches 7b and 7m formed in the periphery thereof and opposed to each other with the optical axis of the holding frame between them. The notch 7b is used to directly firmly bear the sub rod 7f that is a rod-like guide member, while the notch 7m is used to firmly bear a sleeve 7p. The sleeve 7p is, as described later, a tubular member having an engagement hole 7t in which the main rod 7e that is a rod member (rod-like guide member) is, as described later, borne while being permitted to freely slide.

Planes containing two sides 7c of a cross section of the notch 7b are formed to be parallel to the optical axis of the holding frame by performing molding or machining. One edge of the second group-of-lenses sub rod 7f that is a rod-like guide member is abutted on the notch 7b. An inclined surface of a bent fixing chip 7d secured using a screw 7g compresses the sub rod 7f, whereby the sub rod 7f is secured. Since the inclined surface of the fixing chip 7d is pressing the sub rod 7f, the sub rod 7f abuts on the planes containing the two sides 7c of the cross-section of the notch 7b. Consequently, the sub rod 7f is secured to be parallel to the optical axis of the holding frame.

Planes containing two sides 7n of a cross section of the notch 7m are formed to be parallel to the optical axis of the holding frame by performing molding or machining. The sleeve 7p that is a tubular guide member is secured to the notch 7m with the periphery thereof compressed by the inclined surface of a bent fixing chip 7q that is fixed using a screw 7r. Since the inclined surface of the fixing chip 7q is pressing the sleeve 7p, the sleeve 7p abuts on the planes containing the two sides 7n of the cross section of the notch 7m. Consequently, the sleeve 7p is secured while being parallel to the optical axis of the holding frame. The second group-of-lenses main rod 7e that is a rod member (rod-like guide member) is precisely inserted in the sleeve 7p (with a very narrow gap, which is so narrow as not to deteriorate the optical performance of the entire lens barrel, between them) while being permitted to freely slide.

The second group-of-lenses main rod 7e inserted in the sleeve 7p has a head 7s formed as a front end thereof. The head 7s abuts on the front end of the sleeve 7p that serves as a restricting means (first restricting means). Therefore, when the second group-of-lenses holding frame 7 is thrust forward, the distal end of the main rod 7e is prevented from advancing inward beyond the front end of the sleeve 7p.

Instead of the head 7s of the main rod 7e, an E-ring groove may be formed in the main rod 7e and an E ring may be fitted in the E-ring groove. Moreover, the sleeve 7p may not be adopted but a rod guide hole may be formed in the second group-of-lenses holding frame 7. The main rod 7e may then be passed through the rod guide hole and thus borne to be able to slide freely.

The end of the main rod 7e opposite to the end thereof borne by the sleeve 7p is inserted in the engagement hole 1b formed in the stationary frame 1 so that the main rod 7e can freely slide. Moreover, the end of the rod 7f opposite to the end compressed by the fixing chip is inserted in the engagement oblong hole 1c formed in the stationary frame 1 so that the rod 7f can freely slide. Consequently, the second group-of-lenses holding frame 7 in which the second group of lenses 51 is mounted can advance or withdraw along the optical axis O but will not rotate. Moreover, the third group-of-lenses holding frame 8 that is the other lens holding frame and is borne and guided by the rods 7e and 7f while being permitted to freely slide is laid at the middles of the rods 7e and 7f. The third group-of-lenses holding frame 8 can advance or withdraw along the optical axis O but will not rotate with respect to the stationary frame 1.

The second group-of-lenses drive strip 7h that drives the holding frame 7 in the axial directions and extends along the optical axis is screwed to the holding frame 7. A roller 7j is attached to the distal end of the drive strip 7h using a pin 7i while being permitted to freely rotate. The roller 7j is fitted in both the cam groove 5c formed in the outer zoom drum 5 and the rectilinear groove 2c formed in the stationary lens frame 2. Consequently, the second group-of-lenses holding frame 7 moves along the optical axis O owing to the drive strip 7h responsively to the rotation or axial directional movement of the outer zoom drum 5. The second group of lenses 51 is moved accordingly. The drive strip 7h is located in the space of the concave part 6e of the first group-of-lenses frame 6.

The third group-of-lenses holding frame 8 holds the third group of lenses 52. The third group-of lenses holding frame 8 is borne by both the second group-of-lenses main rod 7e and the sub rod 7f while being permitted to slide freely along the optical axis. The second group-of-lenses main rod 7e is inserted in the sleeve 7p fixed to the second group-of-lenses frame 7 while being permitted to freely slide by itself, and the sub rod 7f is fixed to the second group-of-lenses frame 7. Moreover, the second group-of-lenses main rod 7e and sub rod 7f that are inserted in the second group-of-lenses frame 7 are opposed to each other with the optical axis between them. Specifically, the main rod 7e is fitted in a notch 8c formed in the third group-of-lenses holding frame 8. The sub rod 7f bears the holding frame 8 while being inserted into a sleeve 8a as shown in the longitudinal sectional view of FIG. 6 showing the mounted states of the rods. The sleeve 8a is bonded to the holding frame 8 using an adhesive H. The outer diameter of the sleeve 8a itself is determined to such an extent that the sleeve 8a will be loosely fitted in an attachment hole 8b formed in the holding frame 8.

For the above bonding, first, a convex engaging portion 7k of the second group-of-lenses holding frame 7 and a concave engaging portion 8d of the third group-of-lenses holding frame 8 are meshed with each other. At this time, the rod 7e is fitted in the notch 8c, and the rod 7f is inserted in the sleeve 8a fitted in the attachment hole 8b. The adhesive H is poured into the gap between the sleeve 8a and hole 8b, whereby the bonding is achieved.

As mentioned above, the third group-of-lenses holding frame 8 and the third group of lenses 52 alike are properly concentrically positioned with the optical axis in the center. The third group-of-lenses holding frame 8 and the third group of lenses 52 alike can slide to advance or withdraw in parallel to the optical axis without backlash but will not rotate. A compressing spring 18 used to eliminate backlash is mounted on the portion of the rod 7f located between the third group-of-lenses holding frame 8 and second group-of-lenses holding frame 7.

Figure 5:
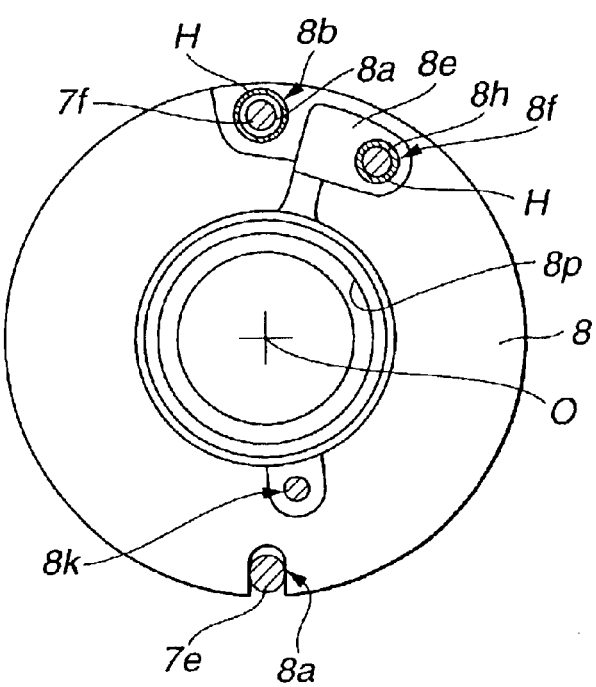
FIG. 5 is a V—V sectional view of the zoom lens barrel shown in FIG. 2.

Two rods of a third group-of-lenses rod 8h and a sub rod 8k are attached to the third group-of-lenses holding frame 8 in order to bear the fourth group-of-lenses holding frame 9, which will be described later, while permitting the fourth group-of-lenses holding frame 9 to freely slide along the optical axis O. The sub rod 8k is embedded in the third group-of-lenses holding frame 8 in parallel to the optical axis O. A hole 8r in which the sub rod 8k is inserted is bored with its diameter and parallelism precisely determined through machining or molding. The rod 8k is press-fitted in the hole 8r and then embedded in the third group-of-lenses holding frame 8. The sub rod 8k and rod 8h are substantially opposed to each other with the optical axis O between them (FIG. 5).

The rod 8h is, as shown in FIG. 6, borne by both the third group-of-lenses holding frame 8 and an arm 8e fixed to the frame 8. Attachment holes 8g and 8f are designed so that the rod 8h is loosely fitted in the holes. The rod 8h is secured by bonding. Prior to the bonding, a sleeve 9c that is loosely fitted in the fourth group-of-lenses holding frame 9 is secured by performing bonding. Specifically, the sleeve 9c is fitted in a through hole 9b bored in a sliding arm 9a of the frame 9. A mechanical jig is used to hold the sleeve 9c in such a manner that the sleeve 9c will lie in parallel to the optical axis of the frame 9. In this state, an adhesive H is poured in order to lock the sleeve 9c in the hole 9b. The rod 8h is passed through the sleeve 9c, and inserted in the hole 8f, which is bored in the arm 8e and in which the rod 8h is loosely inserted, and the hole 8g alike. An E snap ring 8m for preventing occurrence of displacement before bonding is attached to the end of the rod 8h.

Thereafter, a convex engaging portion 9g of the fourth group-of-lenses holding frame 9 that is formed concentrically with the optical axis is meshed with a concave engaging portion 8p of the second group-of-lenses holding frame 8 that is formed concentrically with the optical axis. At the same time, the sub rod 8k is fitted in a notch 9d of the holding frame 9. Thus, the optical axes of the holding frames 8 and 9 are aligned with each other, and the direction of the rod 8h is matched with the direction of the optical axes. The adhesive H is then poured into the holes 8g and 8f of the holding frame 8 in order to bond and secure the rod 8h. The third and fourth groups of lenses 52 and 53 are held in the holding frames 8 and 9 concentrically with the optical axis O and movable in parallel to each other.

The sliding pin 8j that is fitted in the cam groove 4a formed in the inner zoom drum 4 is fixed to a pin mount 8s formed on the third group-of-lenses holding frame 8. The holding frame 8 is therefore advanced or withdrawn along the optical axis O responsively to the rotation of the zoom drum 4. Moreover, the aperture stop unit 15 is mounted on the object side of the third group-of-lenses holding frame 8. The charge lever 25 pivoted to the stationary frame 1 is manipulated in order to operate the aperture stop unit 15 via a charged lever 15a, whereby light limiting is performed.

The charged lever 15a is realized with a member elongated along the optical axis. Even if the holding frame 8 is moved along the optical axis, the charged lever 15a will not be disengaged from the charge lever 25. Moreover, a photointerrupter and an electromagnet are incorporated in the aperture stop unit 15 in order to control light limiting. The aperture stop unit 15 must therefore be electrically connected to the camera. Therefore, the aperture stop unit 15 includes a flexible printed-circuit board 15b for electrical connection.

The fourth group-of-lenses holding frame 9 holds the fourth group of lenses 53. As mentioned above, the fourth group-of-lenses holding frame 9 is borne by the two rods 8h and 8k attached to the third group-of-lenses holding frame 8 while being permitted to freely slide. The rod 8h bears the fourth group-of-lenses holding frame 9 with the sleeve 9c between them. The sliding pin 9f that is fitted in the cam groove 4b formed in the inner zoom drum 4 is fixed to the sliding arm 9a of the fourth group-of-lenses holding frame 9 using a screw 9e. The holding frame 9 is therefore advanced or withdrawn along the optical axis O responsively to the rotation of the zoom drum 4.

The fifth group-of-lenses holding frame 10 holds the fifth group of lenses 54. As for mounting, first, the periphery 10a of the fifth group-of-lenses holding frame 10 is engaged with the engagement hole 1a of the stationary frame, and the optical axis of the group of lenses is aligned with the optical axis O. Thereafter, fixing portions 10b of the holding frame 10 that are intended to determine the optical-axis directional position of the holding frame 10 are screwed to the stationary frame 1, whereby the fifth group-of-lenses holding frame 10 is mounted in the stationary frame 1.

Figure 7:
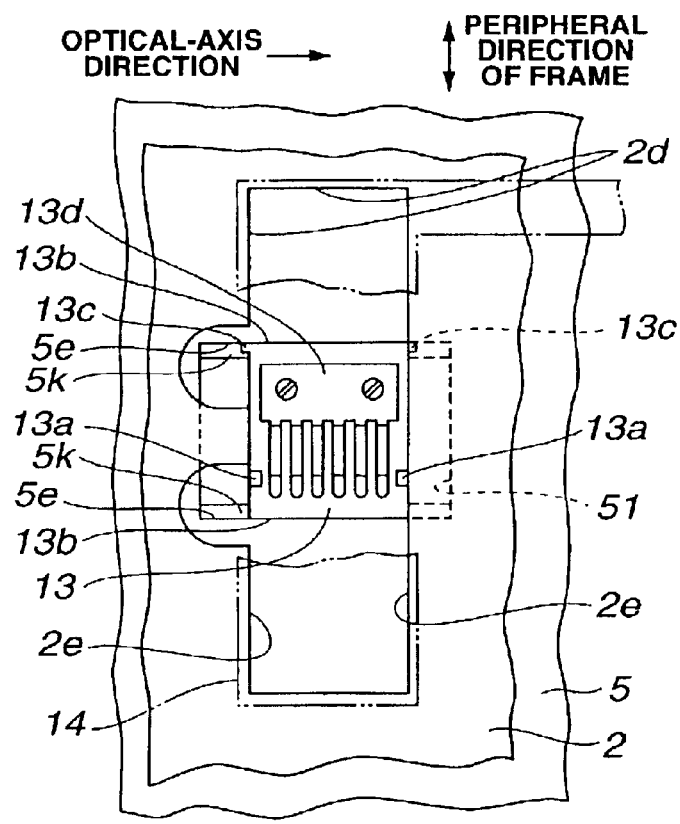
FIG. 7 shows the development of a zoom encoder incorporated in the zoom lens barrel in accordance with the embodiment shown in FIG. 1.

The zoom encoder detects an angle of rotation by which the outer zoom drum 5 or inner zoom drum 4 rotates about the optical axis. As shown in FIG. 7, the zoom encoder consists of the contact base 13, a contact chip 13d, an encoder substrate 14, and a metallic panel 14a. The contact chip 13d is fixed to the contact base 13 and slides together with the contact base 13 on a conduction pattern printed on an encoder substrate 14. The metallic panel 14a protects the substrate 14.

The contact base 13 includes projections 13c that project from both sides of the contact base and edge projections 13a that project from both the sides thereof toward the contact chip 13d and have a slight height. The contact base 13 is fitted in a stepped rectangular hole 5f that has a step 5k and that is formed in the outer zoom drum 5. The backs of edges 13b of the contact base 13 are abutted on the step 5k of the rectangular hole 5f.

The rectangular hole 5f has dimensions that permit engagement surfaces 5e of the zoom drum 5, which are opposed to each other in a direction of rotation, to engage with the edges 13b of the contact base 13 without a gap. Moreover, the axial directional length of the rectangular hole 5f is larger than the sum of the width of the edge projections 13a and a maximum distance in an axial direction moved by the zoom drum 5.

The oblong hole 2d of the stationary lens frame 2 is located above the rectangular hole 5f. The width in a direction of rotation of the oblong hole 2d is determined with the time during which the outer zoom drum 5 is permitted to rotate responsively to by the circumferential directional movement of the contact base 13. An engagement width 2e that is the axial directional width of the oblong hole 2d is set to a dimension permitting the edge projections 13a of the contact base 13 or both sides thereof to slide.

The contact base 13 can move within the oblong hole 2d according to an angle of rotation by which the outer zoom drum 5 has rotated to whatever axial directional position the outer zoom drum 5 is located. The contact base 13d moves in a direction of rotation while sliding on the encoder substrate 14 placed over the oblong hole 2d. An angle of rotation by which the zoom drum 5 rotates for zooming can therefore be detected. The contact base 13 included in the zoom encoder has the projections 13c thereof pressed by the edges of the oblong hole 2d that determine the width 2e. The contact base 13 is therefore hardly detached from the rectangular hole 5f.

Figure 8:
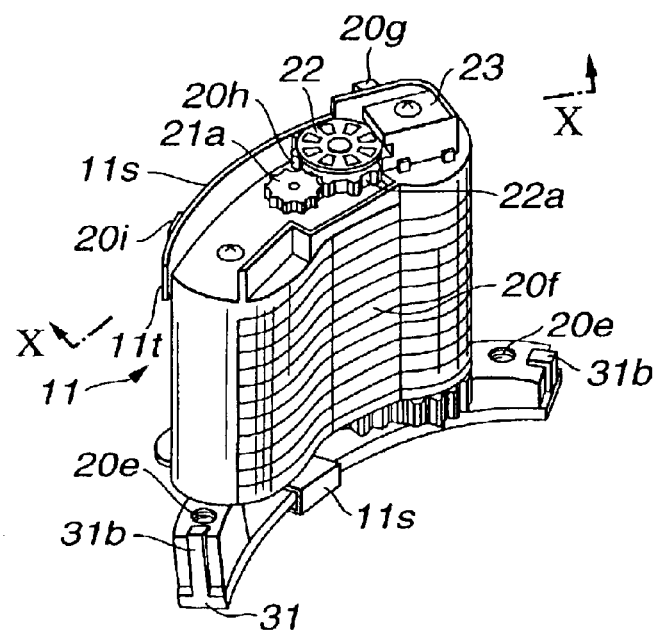
FIG. 8 is a perspective view showing a focus drive unit mounted in the zoom lens barrel in accordance with the embodiment shown in FIG. 1.
Figure 9:
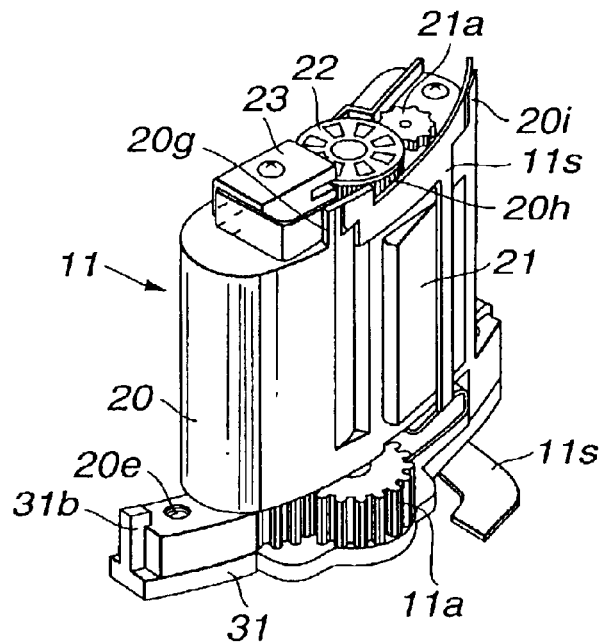
FIG. 9 is a perspective view of the focus drive unit that is mounted in the zoom lens barrel shown in FIG. 1 and that is seen from behind the focus drive unit shown in FIG. 8.
Figure 10:
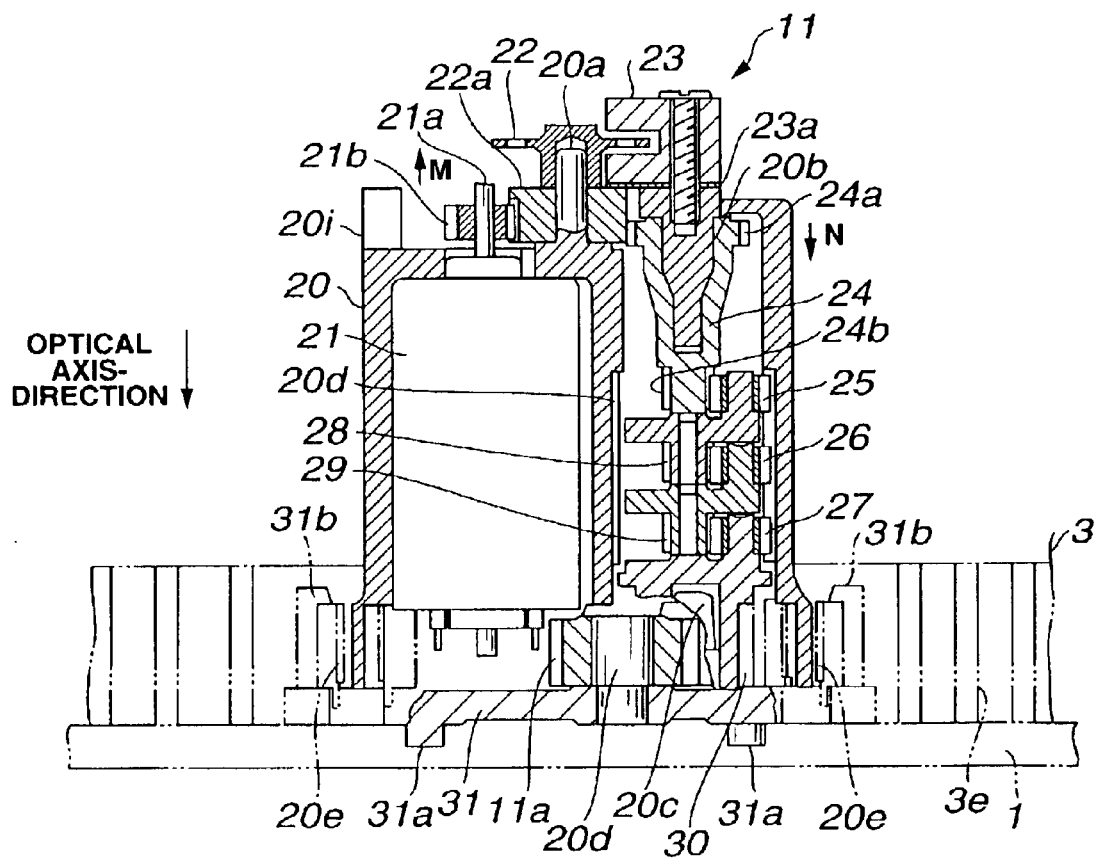
FIG. 10 is a X—X sectional view of the focus drive unit shown in FIG. 8.

The focus drive unit 11 will be described in conjunction with FIG. 8 to FIG. 12. FIG. 8 is a perspective view showing the appearance of the unit 11, and FIG. 9 is a perspective view of the appearance of the unit 11 seen from behind the unit 11. FIG. 10 is a X—X sectional view of the unit 11 shown in FIG. 8.

The focus drive unit 11 consists mainly of a unit case 20, a focus drive motor 21, a motor output gear 21b, a speed reducing gear train, a unit output gear 11a, a unit case retaining plate 31, a drive unit rotation detector, and a flexible printed-circuit board 11s. The motor output gear 21b is an output gear fixed to a motor output shaft 21a. The speed reducing gear train includes a gear that meshes with the gear 21b, sun gears, and planetary gears. The flexible printed-circuit board 11s electrically connects the unit 11 to the motor 21 and photo-interrupter 23.

Figure 11:
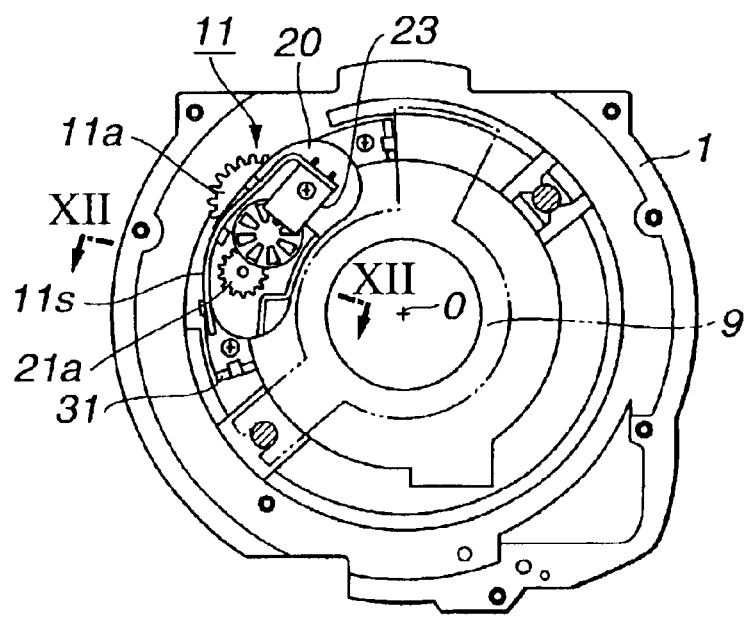
FIG. 11 shows the zoom lens barrel in accordance with the embodiment shown in FIG. 1 with the focus drive unit mounted in a stationary frame.

The focus drive unit 11 is, as mentioned above, attached to the attachment surface 1h that is exposed by cutting away part of the cylindrical part 1e of the stationary frame 1. Therefore, the motor 21, speed reducing gear train, case 20, and case retaining plate 31 are arranged along a line curved at the curvature exhibited by the cylindrical part 1e (FIG. 11).

The rotation detector consists of a slit disk 22 and the photo-interrupter 23. The photo-interrupter 23 is screwed to the unit case 20 with a slide panel 23a, which has lubricity, between them. The slit disk 22 that rotates to provide the photo-interrupter 23 with an input signal is integrated with a gear 22a that meshes with the motor output gear 21b, and engaged with a shaft 20a of the case 20 while being permitted to freely rotate. The slide panel 23 acts as a detent preventing the gear 22a from coming off in an axial direction.

A power conveyance path from the motor output gear 21b through the speed reducing gear train to the unit output gear 11a will be described below. To begin with, the output rotation of the motor is conveyed to a gear 24 including a sun gear 24b via the gear 22a that meshes with the gear 21b. The rotation of the sun gear 24b is conveyed to three planetary gears 25 that mesh with the sun gear 24b. The planetary gears 25 are borne by a shaft integrated with a backing for a sun gear 28 while being prevented from coming off in an axial direction. The planetary gears 25 are meshed with an internal gear 20d formed on the inner wall of the case 20. The planetary gears 25 rotate and revolve along with the rotation of the sun gear 24b. The sun gear 28 rotates along with the rotations of the planetary gears 25. The rotation of the sun gear 28 is conveyed to planetary gears 26 that are meshed with the sun gear 28, to a sun gear 29 that is rotated by the planetary gears 26, to planetary gears 27 that are meshed with the sun gear 29, and to a gear 30 that is rotated by the planetary gears 27. The gear 30 is meshed with the unit output gear 11a that is the last stage of the power conveyance path. The output gear 11a provides speed-reduced rotation.

The gear 24, gear 30, and output gear 11a are borne by shafts 20b, 20c, and 20d that are integrated with the unit case 20. The sun gears 28 and 29 are retained in an axial center owing to the engagements of the three planetary gears 26 or 27 without the necessity of bearing shafts. As for the axial directional positions of the sun gears 28 and 29, the sun gears 28 and 29 are retained in place with the end surfaces thereof brought into contact with each other. The unit case retaining plate 31 is included for holding the gears 30 and 11a in place within the case 20. In order to attach the case retaining plate 31 to the case, two retaining clamps 31b are engaged with seats formed in attachment holes 20e in the case 20 by utilizing elasticity.

In order to attach the focus drive unit 11 to the lens barrel, as shown in FIGS. 1 and 9, the case retaining plate 31 is abutted on the attachment surface 1h of the stationary frame 1. Positioning dowels 31a are fitted in holes formed in the stationary frame 1, and the unit 11 is fixed to the lens barrel by fastening screws inserted in the attachment holes 20e. The internal gear 3e formed on the focus ring 3 that is a driven member and borne by the stationary frame 1 while being permitted to freely rotate is meshed with the unit output gear 11a. Thus, focusing driving is enabled. The output shaft 21a of the motor 21 to which the motor output gear 21b is fixed is extended in a direction M parallel to the direction of the optical axis. The aforesaid power conveyance path led through the speed reducing gear train that is meshed with the gear 21b goes in a direction N opposite to the direction M. The rotation output is transferred from the unit output gear 11a located on the attachment surface.

The electrical connection printed-circuit board 11s connected to the photo-interrupter 23 is, as shown in FIGS. 8 and 9, hooked on guide strips 20g, 20h, and 20i that are integrated with the case 20. An L-shaped portion 11t that is the distal part of the printed-circuit board 11s serves as a stopper for preventing the printed-circuit board 11s from coming off from the guide strip 20i (FIG. 8).

Figure 12:
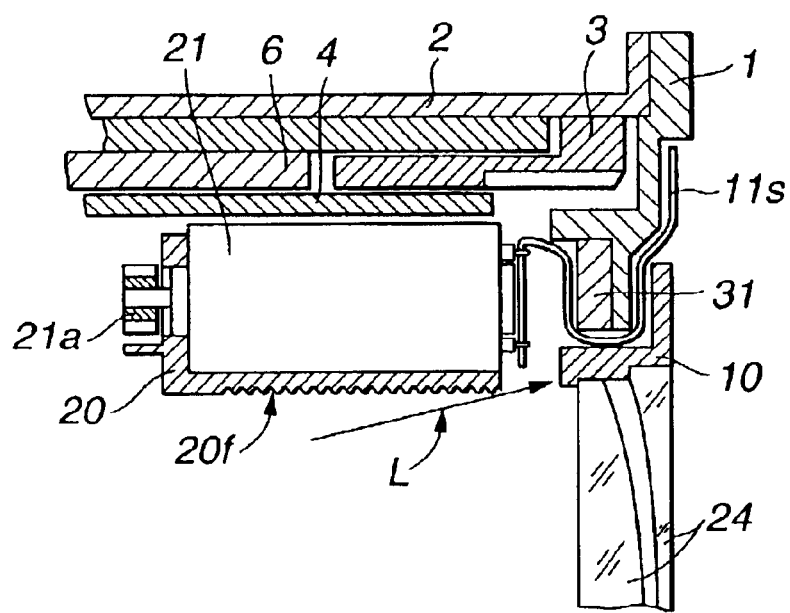
FIG. 12 is a XII—XII sectional view of the zoom lens barrel shown in FIG. 11.

FIG. 12 is a XII—XII sectional view of the lens barrel shown in FIG. 11, showing a longitudinal section of the lens barrel with the unit 11 attached thereto. The internal surface of the unit case 20 facing an optical path and being curved at a certain curvature includes a light interceptive surface 20f whose triangularly-grooved section has triangles separated from one another in units of a small pitch. The light interceptive surface 20f intercepts unnecessary light that travels outside light L. Moreover, the printed-circuit board 11s is folded in the form of letter S and routed to the back of the stationary frame 1.

Next, zooming and focusing, and collapse performed by the zoom lens barrel in accordance with the present embodiment having the aforesaid components will be described below. Hereinafter, a direction of rotation shall be a direction seen from an object.

FIG. 3 shows the lens barrel with the lens frames collapsed. Specifically, the first group-of-lenses frame 6 and second group-of-lenses holding frame 7 are collapsed. The second group-of-lenses main rod 7e itself slides with the distal end thereof held within the sleeve 7p. Consequently, the position of the second group-of-lenses main rod 7e relative to the second group-of-lenses holding frame 7, that is, the sleeve 7p changes. The head 7s that is the distal end of the main rod 7e juts out of the distal end of the sleeve 7p and lies in the notch 50a of the first group of lenses 50. The main rod 7e slides with the rear end thereof held within the engagement hole 1b formed in the stationary frame 1. The rear end of the main rod 7e abuts on the spacer 40 that serves as a restricting means (a second position restricting means). Thus, the rear end of the main rod 7e will not jut backward beyond the stationary frame 1 but stays within the lens barrel.

Movements to be made for zooming from the positions for collapse to long-focus photo positions will be described below.

Figure 13:
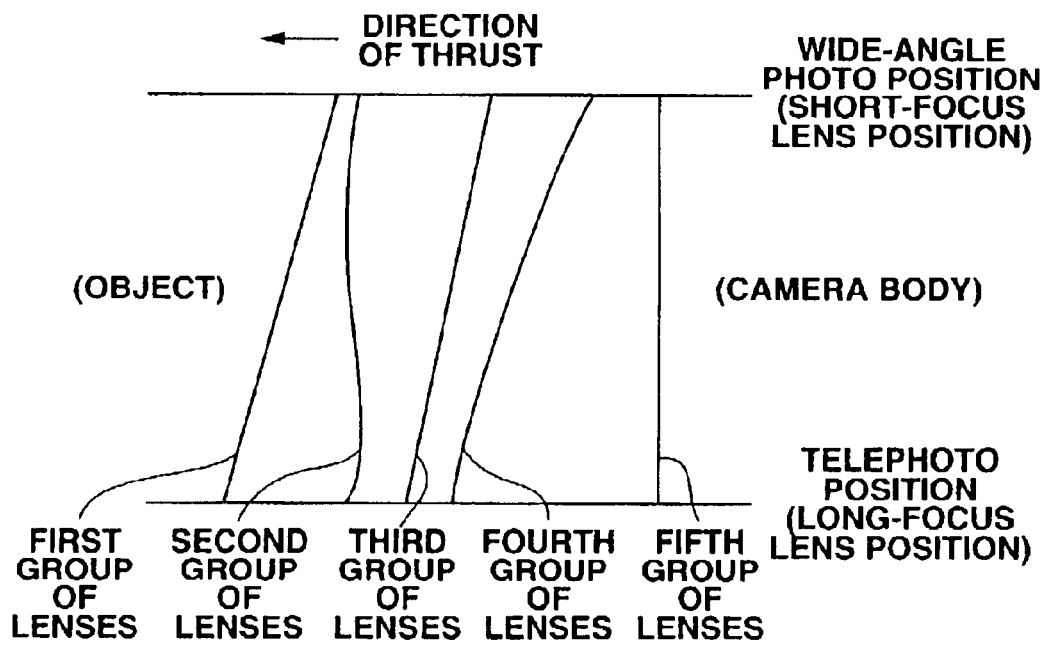
FIG. 13 shows positions for plunge to which groups of lenses incorporated in the zoom lens barrel in accordance with the embodiment shown in FIG. 1 are thrust during zooming driving.
Figure 14:
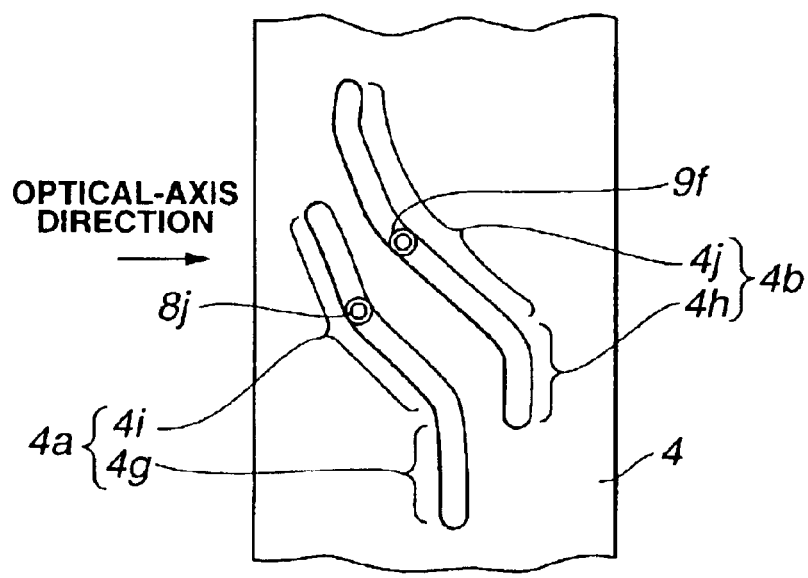
FIG. 14 shows the development of cam grooves formed in an inner zoom drum incorporated in the zoom lens barrel in accordance with the embodiment shown in FIG. 1.

FIG. 13 shows positions between wide-angle photo positions and telephoto positions inclusive to which the groups of lenses are thrust. In response to a zoom instruction issued from a system controller (not shown), the zoom drive unit 12 drives the first to fourth groups of lenses to the positions for thrust. Specifically, the inner zoom drum 4 is rotated clockwise via the output gear 12a included in the drive unit 12. Along with the rotation, the sliding pins 8j and 9f shift from the collapse groove portions 4g and 4h of the cam grooves 4a and 4b to the zoom groove portions 4i and 4j respectively (FIG. 14). The third and fourth group-of-lenses frames 8 and 9 to which the pins are fixed are moved accordingly. Consequently, the third and fourth groups of lenses 52 and 53 are thrust to the positions for zooming. On the other hand, the outer zoom drum 5 rotates in the same direction as the inner zoom drum 4 via the roller 4f borne by the inner zoom drum 4. The rotation causes the rollers 6b and 7j to shift from the collapse groove portions 5j and 5g of the cam grooves 5c and 5d to the zoom groove portions 5i and 5h respectively (FIG. 15A). At the same time, the rollers 6b and 7j that are also fitted in the rectilinear grooves 2b and 2c formed in the stationary lens frame 2 are moved rectilinearly toward an object. Within the rectilinear groove 2c, the roller 7j shifts from the collapse groove portion 2i to the zoom rectilinear groove portion 2h.

During zooming during which the groups of lenses shift from the positions for collapse through the wide-angle photo positions to the telephoto positions, the main rod 7e floats within the sleeve 7p and the engagement hole 1b of the stationary frame 1 until the head 7s thereof abuts on the front end of the sleeve 7p. After the head 7s abuts on the front end of the sleeve 7p, the main rod 7e moves in a direction of thrust together with the sleeve 7p and second group-of-lenses holding frame 7.

During zooming driving, the immovable sliding pin 3d is fitted in the focus cam groove 5b formed in the outer zoom drum 5. Owing to the cam operation, the outer zoom drum 5 itself moves toward an object by a distance corresponding to a magnitude of focus correction. Therefore, a distance moved by the first group-of-lenses frame 6 or second group-of-lenses holding frame 7, to which the rollers 6b and 7j are directly or indirectly fixed, for zooming comes to the sum of a distance by which the holding frame is driven due to the cam groove 5c or 5d formed in the outer zoom drum 5 and the distance corresponding to a magnitude of focus correction by which the holding frame is driven due to the focus cam groove 5b.

The movements to be made for zooming have been described on the assumption that the groups of lenses are moved to the long-focus photo positions. In order to move the groups of lenses to the short-focus photo positions, the inner zoom drum is driven counterclockwise. The movements to be performed in this case are opposite to the movements described above.

Zooming resulting from zooming driving is detected by detecting the rotation of the outer zoom drum 5 using the zoom encoder. The actions of the zoom encoder will be described in conjunction with FIGS. 1 and 6. The encoder produces a coded signal concerning a position for zooming by bringing the contact chip 13d borne by the contact base 13 into contact with the conduction pattern on the encoder substrate 14 attached to the stationary lens frame 2.

The contact base 13 is fitted in the rectangular hole 5f formed in the outer zoom drum 5 with, as mentioned above, the circumferential directional edges thereof alone engaged with the outer zoom drum 5. The axial directional edges of the contact base 13 are engaged with the edges of the oblong hole 2d of the stationary lens frame 2 that determine the width 2e. Therefore, the contact chip 13d slides on the conduction pattern along with the rotation of the zoom drum 5. The zoom drum 5 also moves in the axial directions. Since the axial directional width of the rectangular hole 5f is larger than the width of the contact base 13, the contact base 13 has the edge projections 13a guided along the edges of the oblong hole 2d of the stationary frame 2 that determine the width 2e, and the contact chip 13d slides on the encoder substrate 14. Consequently, a position-of-zooming detection signal is produced.

Next, movements to be made for focusing will be described on the assumption that the setting of the distance to an object is changed from infinity to a predetermined distance. In response to a focusing instruction issued from the system controller, the focus drive unit 11 is driven in order to rotate the focus ring 3 counterclockwise via the unit output gear 11a. Along with the rotation, the sliding pin 3d fixed to the focus ring 3 slides within the focus cam groove 5b formed in the outer zoom drum 5. This causes the zoom drum 5 to move toward an object. In this case, the inner zoom drum 4 stands still, and the outer zoom drum 5 moves rectilinearly. The first group-of-lenses frame 6 or second group-of-lenses holding frame 7 is moved via the roller 6b or 7j. Consequently, the first group of lenses 50 and second group of lenses 51 that are groups of focusing lenses are thrust toward the object.

Movements to be performed for focusing by changing the setting of the distance to an object from a near distance to a far distance are achieved by driving the focus ring 3 in a direction opposite to the direction in which the focus ring 3 is driven as mentioned above.

Next, movements to be performed in order to collapse the lens frames included in the zoom lens barrel in accordance with the present invention when photography is completed will be described in conjunction with FIGS. 1 and 2 or FIGS. 15A and 15B.

To begin with, the focus drive unit 11 is driven in order to rotate the focus ring 3 clockwise. This causes the first and second groups of lenses to withdraw to the infinite in-focus positions toward the camera body.

Thereafter, the zoom drive unit 12 is driven in order to rotate the inner zoom drum 4 counterclockwise. An angle of rotation by which the inner zoom drum 4 is rotated counterclockwise corresponds to a phase exhibited by the lens frames that have collapsed and which is larger than a phase exhibited by the lens frames that have moved to the short-focus photo positions for zooming. Consequently, the sliding pins 8j and 9f fitted in the cam grooves 4a and 4b formed in the inner zoom drum 4 are shifted to the collapse cam groove portions 4g and 4h.

At the same time, the outer zoom drum 5 rotates by the same angle of rotation as the zoom drum 4 does. The rollers 6b and 7j are, as shown in FIG. 15B, shifted to the collapse cam groove portions 5g and 5j of the cam grooves 5c and 5d formed in the zoom drum 5. Consequently, the first group-of-lenses frame 6 and second group-of-lenses holding frame 7 are withdrawn to the positions for collapse, or in other words, plunged into the camera body beyond a position associated with the setting of the distance to an object of infinity. As mentioned above, when the first group-of-lenses frame 6 withdraws to the position for collapse, unless the second group-of-lenses holding frame 7 moves away from its normal range of positions for zooming, the second group-of-lenses holding frame 7 may interfere with the first group-of-lenses holding frame 6c and first group of lenses 50 or may be blocked therewith. Therefore, the collapse rectilinear groove portion 2i and collapse cam groove portion 5g are shaped so that the roller 7j will be loosely fitted in the collapse rectilinear groove portion 2i and collapse cam groove portion 5g. Thus, the interference is avoided and collapse is achieved reliably.

In a conventional lens barrel, rod members for bearing frame members while permitting them to freely slide have the ends thereof fixed to one frame member. However, in the zoom lens barrel in accordance with the present embodiment, the ends of the second group-of-lenses main rod 7e are attached to the second group-of-lenses holding frame 7 and stationary frame 1 so that the second group-of-lenses main rod 7e can freely slide. Consequently, when the lens barrel is collapsed, if the second group-of-lenses holding frame 7 approaches too closely to the stationary frame 1, the main rod 7e can be moved forward by a length corresponding to a dimension by which the main rod 7e juts out from the rear end of the stationary frame 1. This is because the axial directional position of the main rod 7e relative to the second group-of-lenses holding frame 7 and stationary frame 1 is not restricted to any specific position. The lens barrel can be collapsed without the necessity of jutting the main rod 7e out from the rear end of the stationary frame 1 because the main rod 7e can move independently in the lens barrel. Eventually, no restrictions are imposed on arrangement of components within a camera body on which the lens barrel is mounted, but the overall length of the lens barrel in the collapsed state can be made shorter.

As described so far, according to the embodiment of the present invention, there is provided a lens barrel whose length can be reduced without the necessity of imposing significant restrictions on arrangement of components within a camera on which the lens barrel is mounted. Besides, the lens barrel has a simple structure.

What is claimed is:

1. A lens barrel comprising:
a frame member movable along an optical axis; and
a rod member incorporated in said lens barrel in order to guide said frame member to move slidably on the rod member along the optical axis, said rod member being borne while being permitted to freely move along the optical axis by itself.

2. A lens barrel according to claim 1, wherein:
along with the optical-axis directional movement of said frame member, said rod member is brought to one of: (i) a state in which said rod member abuts on said frame member along the optical axis and moves together with said frame member along the optical axis, and (ii) a state in which said rod member slides along the optical axis relatively to paid frame member.

3. A lens barrel comprising:
a first frame member movable along an optical axis;
a rod member incorporated in said lens barrel in order to guide said first frame member to move along the optical axis;
a second frame member movable along the optical axis relatively to said first frame member,
wherein said rod member is engaged with said first frame member and said second frame member and can freely slide along the optical axis by itself.

4. A lens barrel according to claim 3, wherein along with the optical-axis directional movement of said first frame member, said rod member is brought to one of: (i) a state in which said rod member abuts on said first frame member along the optical axis and move together with said first frame member, and (ii) a state in which said rod member slides along the optical axis relatively to said first frame member.

5. A lens barrel according to claim 4, wherein said rod member includes an abutment capable of abutting on said first frame member along the optical axis so as to move together with said first frame member.

6. A lens barrel according to claim 3, further comprising restricting means for restricting movement of said rod member, and wherein said rod member can slide by itself and is permitted to move within a predetermined range along the optical axis.

7. A lens barrel according to claim 6, wherein said restricting means includes a first position restricting part on which a first end of said rod member disposed along the optical axis can abut and a second position restricting part on which a second end of said rod member can abut along the optical axis.

8. A lens barrel according to claim 7, wherein said first position restricting part is located ahead of said first frame member, and said second position restricting part is located behind said second frame member.

9. A lens barrel according to claim 3, further comprising a third frame member movable along the optical axis relatively to said first frame member and said second frame member, wherein:
said rod member is engaged with said third frame member and can freely slide along the optical axis by itself.

10. A lens barrel according to claim 9, further comprising a sub rod member that is integrated with said first frame member, and that is engaged with said second frame member and said third frame member so that said second frame member and said third frame member can slide along the optical axis.

11. A lens barrel comprising:
- a plurality of frame members borne to be movable along an optical axis relative to a stationary frame member; and
- a plurality of rod-like guide members which are incorporated in said lens barrel, and which are capable of sliding along the optical axis by themselves relative to said plurality of frame members and said stationary frame member, said rod-like guide members being respectively engaged with said plurality of frame members and said stationary frame member, and guiding said plurality of frame members to move along the optical axis.

12. A lens barrel according to claim 11, wherein said plurality of frame members each have an engagement hole or a notch in which said guide members are respectively fitted so that said plurality of frame members can freely slide.

13. A lens barrel according to claim 11, wherein said lens barrel includes: (i) a first position restricting part on which a first end of a first guide member among said plurality of guide members that is disposed along the optical axis can abut along the optical axis so as to restrict movement of said first guide member, wherein said first guide member can freely slide by itself within a predetermined range along the optical axis, and (ii) a second position restricting part on which a second end of said first guide member can abut along the optical axis.

14. A lens barrel according to claim 13, wherein the first and second ends of said first guide member are passed through at least one of said frame members and said stationary frame member.

15. A lens barrel according to claim 13, wherein said first position restricting part is located ahead of a foremost frame member in a direction of the optical axis among said plurality of frame members, and said second position restricting part is located behind said stationary frame member, and wherein said stationary frame member is a rearmost member in the direction of the optical axis.

16. A lens barrel according to claim 13, wherein said lens barrel can stretch and contract along the optical axis, and even when said lens barrel contracts to a greatest extent, said first guide member stays within said lens barrel with the first and second ends of said first guide member located near front and rear ends of said lens barrel respectively.

17. A lens barrel comprising:
- a movable frame capable of moving along an optical axis of said lens barrel within said lens barrel; and
- a rod member that bears said movable frame to guide said movable frame to move slidably on the rod member along the optical axis, wherein said rod member is movable relative to said movable frame along the optical axis, and said rod member can move along the optical axis by itself within said lens barrel and is not fixed to any other member.

18. A lens barrel according to claim 17, further comprising a frame member, wherein said rod member is movable relative to said frame member along the optical axis, and wherein said movable frame moves relative to said frame member along the optical axis.

19. A lens barrel according to claim 18, wherein said frame member comprises a stationary frame.

* * * * *